Feb. 2, 1954 B. ROBERTS 2,668,059

EQUIPMENT FOR USE WITH MULTITRACK MAGNETIC TAPE RECORDS

Filed April 26, 1947 3 Sheets-Sheet 1

INVENTOR
Bruce Roberts
BY
Lynnstedt & Lechner
ATTORNEYS

EQUIPMENT FOR USE WITH MULTITRACK MAGNETIC TAPE RECORDS

Filed April 26, 1947 3 Sheets-Sheet 2

INVENTOR
Bruce Roberts
BY
Synnestvedt & Lechner
ATTORNEYS

Feb. 2, 1954 B. ROBERTS 2,668,059

EQUIPMENT FOR USE WITH MULTITRACK MAGNETIC TAPE RECORDS

Filed April 26, 1947 3 Sheets-Sheet 3

INVENTOR
Bruce Roberts
BY
Seymour & Lehner
ATTORNEYS

Patented Feb. 2, 1954 2,668,059

UNITED STATES PATENT OFFICE 2,668,059

EQUIPMENT FOR USE WITH MULTITRACK MAGNETIC TAPE RECORDS

Bruce Roberts, Philadelphia, Pa., assignor to The International Electronics Company, Philadelphia, Pa., a corporation of Pennsylvania Application April 26, 1947, Serial No. 744,273

27 Claims. (Cl. 274—4)

This invention relates to equipment for use with elongated magnetic records, especially in the form of tape records of appreciable width. The invention is particularly concerned with mechanism for handling and translating such tape records, for instance a flexible tape record comprising a paper tape carrying a coating with magnetizable particles dispersed therein.

One of the primary objects of the invention is to provide equipment of the general type referred to above adapted to utilize a tape for recordings of relatively great length, i. e., recordings requiring considerable time for playback. As an example it is contemplated that the equipment may be used for the recording and playback of literature of extended length, even of book length, which is of especial advantage for a variety of purposes such as educational purposes and for the entertainment of the blind.

Other objects of the invention include a novel arrangement of tape handling and driving devices which are of outstanding structural simplicity and which are capable of most convenient operation by the user of the equipment.

In accordance with another aspect of the invention automatic means are provided for repeatedly reversing the direction of translation of a tape and for concurrently advancing a magnetic scanning device stepwise across the tape, to provide for the successive scanning of a multiplicity of parallel tracks on the tape.

Still further the invention provides a novel control system for automatically coordinating various of the operations of the machine, as will further appear.

How the foregoing, together with other objects and advantages are attained will appear more fully from the following description referring to the accompanying drawings, in which—

Figures 1, 2:
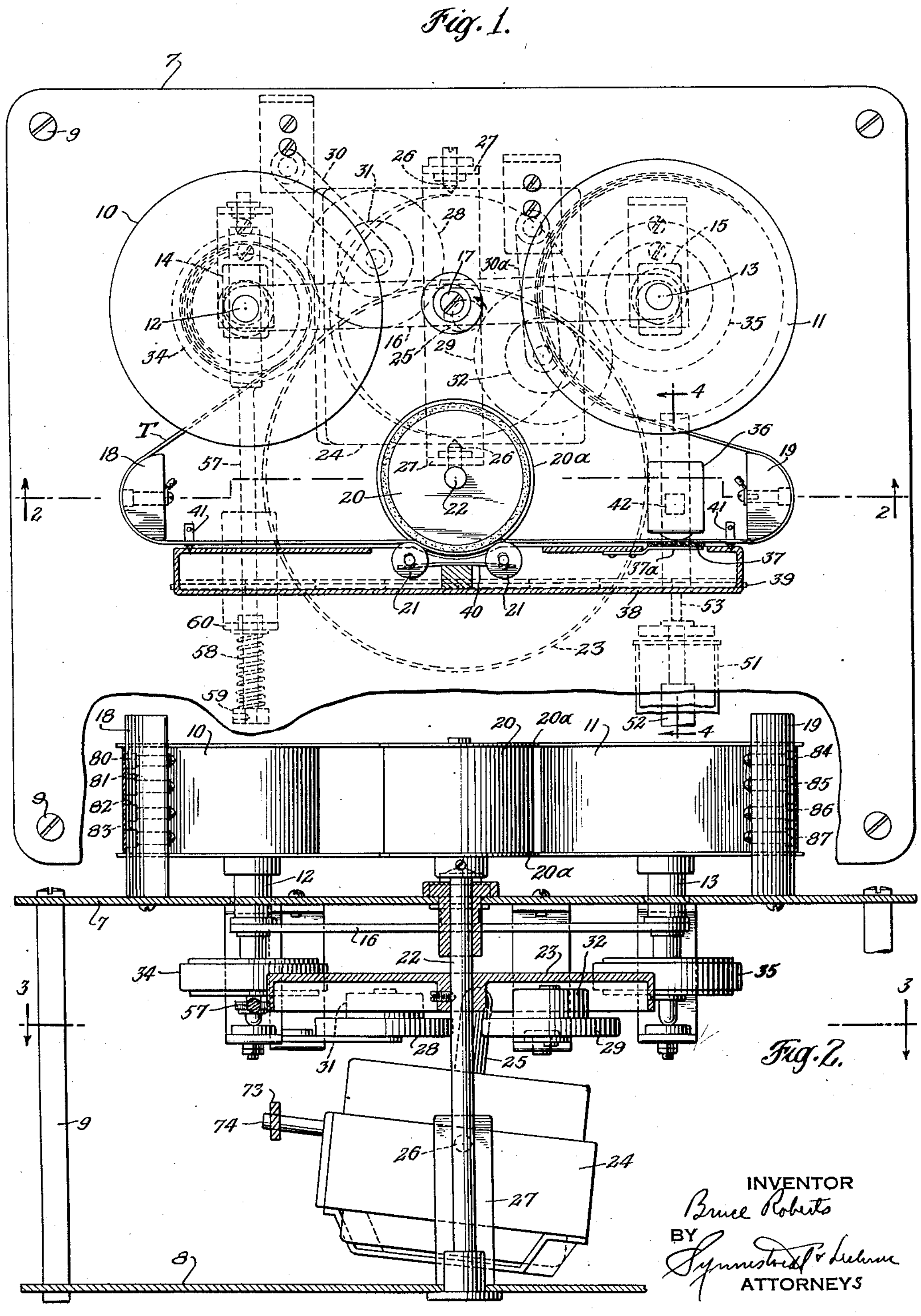
Figure 1 is a plan view, with parts shown in horizontal section, of a machine constructed according to the invention.
Figure 2 is a vertical sectional view taken substantially as indicated by the section line 2—2 on Figure 1.

Referring first to Figures 1 and 2, the machine is built up on a pair of plates 7 and 8, which are interspaced and supported by posts 9. The machine is adapted to receive a pair of tape reels 10 and 11, which are advantageously of width adapted to carry a fairly broad tape, for instance a tape equivalent to the width of the standard 35 mm. moving picture film. The reels are arranged to be removably mounted upon reel spindles 12 and 13 which are extended downwardly through the top plate 7, elongated apertures 14 and 15 being provided in the top plate for this purpose. The spindles are carried by a double-ended lever 16 pivoted for oscillation about the vertical pivot 17. The reels are adapted to be driven by drive mechanism described herebelow.

The feed path of a tape T between the reels is defined by a pair of fixed guide posts 18 and 19 and by the tape driving capstan 20 and the cooperating guide rollers 21—21. Upper and lower tape guiding flanges 20a—20a (the upper one being removed in the illustration of Figure 1) serve to define the path of feed of the tape edgewise thereof. The guide rollers 21—21 are mounted in the manner described herebelow and serve to maintain the tape in frictional engagement with the driving capstan 20 over an appreciable portion of the periphery of the capstan, the capstan having a surfacing with a high coefficient of friction to provide against slippage of the tape thereon. This capstan constitutes the element serving to establish the rate and direction of feed of the tape between the reels 10 and 11.

The capstan is mounted on a shaft 22 which also carries a drive drum 23 against the peripheral flange of which various of the drive elements now to be described are adapted to cooperate.

The driving motor is indicated at 24, this motor being arranged with its shaft 25 extended generally vertically, the motor, however, being carried by a pair of pivots 26—26 supported by standards 27—27 projecting upwardly from the lower or base plate 8. Pivots 26 provide a generally horizontal axis about which the motor as a whole may oscillate for the purpose of reversing the direction of drive.

Oscillation of the motor is adapted to bring the motor shaft 25 alternatively into engagement with one or the other of the drive pucks 28 and 29. The drive puck 28 is carried by a pivoted arm 30 and has a friction surface 31 adapted to engage the external surface of the drive drum 23. Similarly, the puck 29 is carried by a pivoted arm 30a and has a drive surface 32 adapted to engage the internal surface of the drive drum 23.

Figures 3, 4, 5:
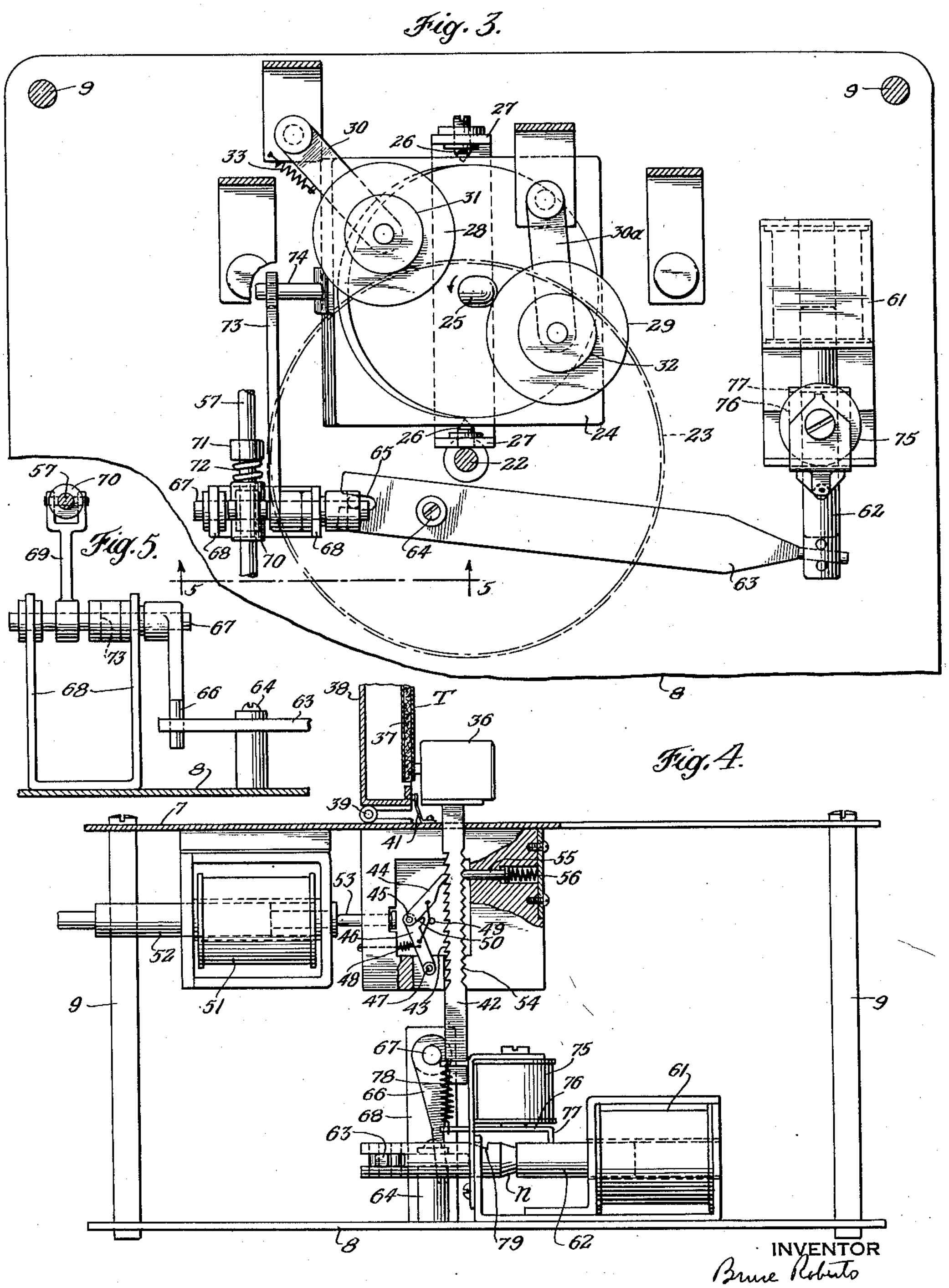
Figure 3 is a plan view of certain parts, especially drive and control parts, the view being taken substantially as indicated by the line 3—3 on Figure 2.
Figure 4 is a vertical sectional view taken as indicated by the section line 4—4 on Figure 1.
Figure 5 is a view of certain details taken as indicated by the line 5—5 on Figure 3.

As best seen in Figure 3, when the motor is oscillated the pucks 28 and 29 serve respectively to drive the drum 23 in opposite directions. A spring 33 may be provided to normally urge the arm 30 in a direction retaining engagement of puck 28 with the drive drum 23. By the foregoing drive mechanism the capstan 20 is alternatively driven in either direction and it may be noted that the direction of rotation of the motor shaft (see the arrow in Figure 3) is such as to provide a "self-energizing" action in either direction of drive, i. e., the relation of the motor shaft and drive pucks to the drive drum 23 is such that in either direction of drive the driving force tends to tighten the frictional engagement of the intermediate driving puck with the drive drum 23. This is of importance in maintaining stability of drive, i. e., constant velocity drive, and thereby eliminating the effect known in the trade as "wow."

The reel spindles 12 and 13 carry frictional drive members 34 and 35, respectively, which upon oscillation of lever 16 are adapted to be brought into engagement with the external surface of the drive drum 23.

During operation of the machine, the tape is adapted to be scanned by the magnetic scanning device or head 36, this head preferably being designed to be capable of use either for recording purposes or for playback. As seen in Figure 1 the head is arranged along the path of the tape between the capstan 20 and the guide post 19 and is located on the same side of the tape as the capstan 20. Interengagement of the tape with the scanning device is maintained by means of a yielding backing pad 37 which is carried by a spring 37a, in turn mounted on a support 38 pivoted to the top plate 7 of the machine by means of the horizontal pivot 39 (see particularly Figure 4). This backing member 38 also serves to yieldingly carry, as by spring 40, the pair of rollers 21—21 above referred to which are arranged to maintain engagement of the tape with the driving capstan. The device 38 is so arranged that the action of gravity tends to maintain the interengagement of the backing pad 37 with the tape opposite to the head 36 and also to maintain guide rollers 21—21 in engagement with the tape in the region of the drive capstan 20. The pivot 39 for the device 38, however, also permits this device to be swung away from the head 36 and the capstan 20, whereby to provide a wide opening or channel in which the tape may conveniently be threaded. Spring pressed catches such as shown at 41, having a snap action, may be used to aid in retaining the member 38 in its operating position.

Attention is now called to the mounting of the recording-reproducing head 36, which mounting is best shown in Figure 4. As there seen, the head is carried by a vertically shiftable post 42 having a rack 43 at one side thereof with which the pawl 44 is arranged to cooperate. Pawl 44 is pivoted at 45 to a lever 46 which in turn is pivoted to a fixed part at 47. A spring 48 urges lever 46 away from the rack 43 and a spring 49 acts to draw the pawl 44 toward the lever 46 to the limit of motion permitted by the stop 50. This pawl device (including the pawl 44 and lever 46) are adapted to be actuated to raise the post 42 stepwise, the actuating mechanism including a solenoid 51 having an armature 52 adapted to drive the tappet 53 toward the right so as to cause the pawl to engage a tooth on rack 43 and raise the post 42 one notch. Vertical positioning of the post 42 is established by a series of teeth 54 with which a detent 55 is adapted to engage, the detent being urged into engagement with the teeth by a spring 56.

Operation of the above described mechanism for raising the scanning head stepwise is coordinated with the mechanism for reversing the reel drive and the capstan drive, the means providing such coordination being described below with particular reference to Figure 6.

As seen in Figures 1, 3 and 5, the oscillatable lever 16 which carries the reel spindles 12 and 13 is adapted to be shifted by means of the horizontally extending rod 57. A spring 58 associated with this rod and reacting between an abutment 59 at the end of the rod and a fixed part 60 normally urges the lever 16 to that position in which the drive wheel 34 on spindle 12 is in engagement with the drive drum 23 and the drive wheel 35 on spindle 13 is disengaged from the drive drum 23. Shifting of the rod 57 in the opposite direction (against the action of spring 58) is effected by means of a solenoid 61 (see particularly Figures 3 and 4). The armature 62 of this solenoid is connected with one end 63 of a lever pivoted at 64, the other end of this lever being notched as at 65 to engage an arm 66 which is fixed on a shaft 67 mounted by means of a bracket 68. Shaft 67 also carries an arm 69 which is forked at its upper end to embrace shift rod 57 and to engage sleeve 70 which is slidable on the shift rod 57. As seen in Figure 3 the shift rod 57 has a collar 71 secured thereto and a spring 72 is interposed between the collar 71 and the sleeve 70. Actuation of the solenoid 61 causes swinging of lever arm 63 about the pivot 64, and this motion is transmitted through arms 66 and 69 to the sleeve 70 and from there through spring 72 to collar 71 and thus to the shift rod 57, the motion being transmitted in a direction in opposition to the return spring 58 and thereby causing the lever 16 which carries the reel spindles to shift in the opposite direction. This motion disengages the drive wheel 34 from the drive drum 23 and engages drive wheel 35 with the drum, thereby shifting the drive from one reel to the other.

The shaft 67 above referred to also carries an arm 73 which is apertured at its free end to receive a pin 74 secured to and projecting from the motor 24 (see also Figure 2). Motion of this arm 73 thus also tilts the motor shaft 25 to bring it into engagement with intermediate drive puck 28. The engagement of the motor shaft 25 with puck 29 is also yieldingly maintained by the return spring 58, above described, which is associated with the shift rod 57.

It may here be mentioned that certain of the drive elements, especially the drive wheels 34 and 35 for the reel spindles and the operating surfaces of the pucks 28 and 29 are advantageously surfaced with a material having a relatively high coefficient of friction. This aids in providing stability of drive. With regard to the drive it is further pointed out that the reel drives tend to overrun the capstan drive, so as to maintain the tape under some slight tension. The drive of the tape by the capstan, however, is controlling, and slippage occurs in the reel drives between the drive drum 23 and the friction wheels 34 and 35.

A solenoid 75 is provided to retain the armature 62 of solenoid 61 in the right hand position (when viewed as in Figure 4). Solenoid 75 has an armature 76 with a tooth 77 yieldingly urged toward the armature 62 by a spring 78. Armature 62 is notched as at 79 and the tooth 77 of armature 76 is adapted to engage in this notch when the armature 62 is shifted to the right. This serves to retain the armature 62 in the position in which the drive wheel 35 for tape reel 11 is in engagement with the drive drum 23 and in which the motor shaft is in engagement with drive puck 28. The operation and control of the various devices described above is discussed herebelow with particular reference to the diagram of Figure 6. First note, however, that guide posts 18 and 19 are preferably formed of electrical insulating material and that each post carries a series of four contact members 80, 81, 82, 83 and 84, 85, 86, 87.

Figure 6:
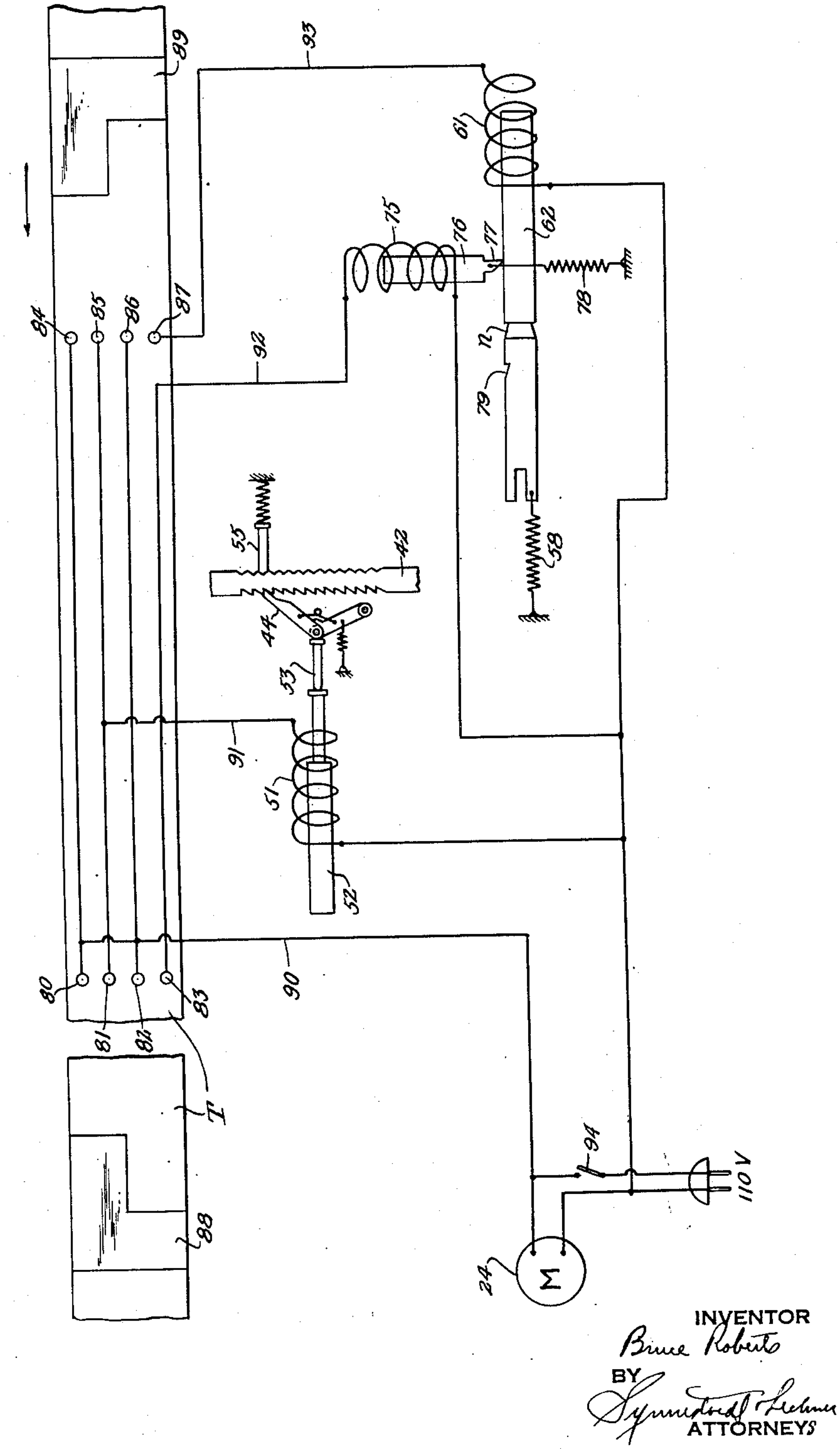
Figure 6 is a schematic view of certain of the control circuits and parts of the machine with which the circuits are associated.

As shown in Figure 6, toward each end of the tape T, the tape carries a contact piece, for instance a piece of metal foil adhesively secured to the tape, as indicated at 88 and 89, and adapted to cooperate respectively with the series of contacts 80—83 and 84—87.

Contacts 80 and 84 are interconnected and are also coupled with wire 90 which is associated with one side of the power supply line. Contacts 81 and 85 are interconnected and also coupled with the wire 91 which is extended to one terminal of the head actuating solenoid 51. Contacts 82 and 86 are likewise interconnected and are associated with wire 90 above referred to. Contact 83 is connected by wire 92 with one terminal of solenoid 75; and contact 87 is connected by wire 93 with one terminal of solenoid 61. The other terminals of the three solenoids, 51, 75 and 61, are all connected with the other side of the power supply line, as is plainly shown. The driving motor 24 also receives current from the supply line, and a shutoff switch 94 is provided.

In considering the diagram of Figure 6, it is assumed that the tape has been running in the direction indicated by the arrow and that substantially all of the tape has been wound up on reel 10 (Figure 1). Moreover, as shown, the tape contact element 89 is approaching the series of contacts 84—87. Upon reaching these contacts, the contact element 89 completes various of the control circuits, as follows:

The circuit through wire 91 and solenoid 51 is completed, thereby actuating the armature 52 and raising the post 42 one notch, thus also lifting the scanning head 36 one track. The circuit including wire 93 and solenoid 61 is completed, thereby moving the armature 62 to the right and causing engagement of tooth 77 in the notch 79. This reverses the drive mechanisms for the tape reels and for the tape driving capstan and initiates transmission of the tape in the reverse direction.

It is here noted that the tape contact element 89 has portions of different dimension axially of the tape. This is provided to ensure adequate time of energization of the solenoid 51 to raise the scanning head to the succeeding track. By variously shaping and proportioning the tape contact elements the time of energization of the solenoids and the sequence of energization thereof may be regulated.

Upon reversal of the direction of translation of the tape as referred to shortly above, the tape is wound up on reel 11 (see Figure 1) and toward the end of this run of the tape, the tape contact element 88 cooperates with the contacts 80 to 83, with the following effects:

The circuit including wire 91 and solenoid 51 is again energized to raise the scanning head to the next track. The circuit including wire 92 and solenoid 75 is energized whereby to lift the armature 76 and thus disengage tooth 77 from the notch 79, whereupon the return spring 58 moves the armature 62 to the left, bringing the drive parts back to the position illustrated in Figures 1 and 3. Another run of the tape now takes place from reel 11 to reel 10.

The successive reversal in direction of scanning continues a multiplicity of times, it being contemplated that in a typical equipment of the character described at least ten side-by-side tracks may be scanned on a tape of a width equivalent to that of the 35 mm. motion picture film. In this way, even with tape reels of relatively small diameter, for instance three inches to three and one-half inches, upwards of an hour's recording may readily be carried on a single tape.

It may be noted that if desired the armature 62 of solenoid 61 may be provided with an intermediate notch *n* which may cooperate with tooth 77 of the armature 76 upon manual shifting of the armature 62. This is provided so that if desired the drive mechanisms may be set in neutral, i. e., a setting in which neither of the reel driving wheels 34 and 35 is in engagement with the drive drum 23 and in which the motor shaft 25 is disengaged from both of the pucks 28 and 29.

I claim:

1. Equipment for use with magnetic tape records, comprising a pair of tape reels between which a tape record is adapted to be fed, a tape driving capstan at one side of the path of feed of a tape between the reels, a magnetic scanning device at the same side of the path of feed of a tape, and displaceably mounted tape backing means at the opposite side of the path of a tape including a backing element positioned to engage a tape opposite to the driving capstan for retaining a tape in engagement with the driving capstan, the backing means further including a backing element connected with the first backing element to move unitarily therewith and positioned to engage a tape opposite to the scanning device for retaining a tape in engagement with the scanning device.

2. Equipment for use with magnetic tape records, comprising a pair of tape reels between which a tape record is adapted to be fed, a tape driving capstan at one side of the path of feed of a tape between the reels, a magnetic scanning device at the same side of the path of feed of a tape, and displaceably mounted tape backing means at the opposite side of the path of a tape for retaining a tape in engagement with the driving capstan and with the scanning device, the tape backing means comprising a unitarily displaceable backing device carrying a backing part adapted to cooperate with the driving capstan and a backing part adapted to cooperate with the scanning device.

3. A construction according to claim 2 in which the backing part cooperating with the driving capstan comprises tape guide means adapted to provide for engagement of a tape with a substantial portion of the periphery of the driving capstan.

4. A construction according to claim 2 in which the backing part cooperating with the scanning device is yielding to provide for intimate interengagement of a tape and the scanning device.

5. A construction according to claim 2 in which the unitarily displaceable backing device is pivotally mounted for swinging movement away from the driving capstan and the scanning device to facilitate threading of a tape.

6. Equipment for use with magnetic tape records, comprising a pair of tape reels between which a tape is adapted to be fed, a tape driving capstan at one side of the path of feed of a tape between the reels, tape guide means at the opposite side of said path providing for engagement of the tape with a substantial portion of the periphery of the capstan, and mounting mechanism for the guide means including a mounting device and a mounting pivot therefor, the axis of the mounting pivot being extended transversely of the axis of the capstan and being offset axially of the capstan from said portion thereof to provide for swinging displacement of the guide means away from the capstan to thereby facilitate threading of a tape in the machine.

7. A construction according to claim 6 in which the guide means comprises a yieldingly mounted guide element.

8. Equipment for use with magnetic tape records, comprising a pair of tape reels between which a tape is adapted to be fed, tape translating means operable to effect feed of the tape in either direction between said reels including means for alternatively driving the tape reels comprising a rotatable element having internal and external cylindrical driving surfaces, a pair of intermediate drive members adapted respectively to engage said internal and external driving surfaces, and a rotative driving member, said members being relatively shiftable to provide for alternative drive from the driving member through either one of the intermediate members to said rotatable element.

9. A construction according to claim 8 in which the driving member is shiftable to alternatively engage one or the other of the intermediate drive members.

10. A construction according to claim 9, further including a motor, and in which said driving member comprises the motor shaft.

11. Equipment for use with magnetic tape records, comprising a pair of tape reels between which a tape is adapted to be fed, tape translating means operable to effect feed of the tape in either direction between said reels, a magnetic scanning device shiftably mounted to scan different tracks on a record, an electrical control device for reversing the direction of tape translation, an electrical control device for shifting the scanning device, and separate control circuits for said control devices each including contact elements adjacent the path of the tape and adapted to be interconnected by contact means carried by the tape.

12. A construction according to claim 11 and further including contact means carried by the tape, the contact means adapted to cooperate with contact elements for one of said circuits being extended lengthwise of the tape a greater distance than the contact means adapted to cooperate with contact elements for the other of said circuits.

13. In a machine for use with magnetic tape records and having a pair of reels between which a tape record is adapted to be fed, a rotative tape translating element adapted to engage a tape in its path between said reels, a drive member rotative with said element and drive mechanism for said drive member comprising a pair of rotative members both rotatable in the same direction, said drive member having internal and external drive surfaces with which the members of said pair are adapted to cooperate, respectively and alternatively, to thereby provide for alternative rotation of said drive member in opposite directions.

14. Equipment for use with magnetic tape records, comprising a pair of tape reels between which a tape is adapted to be fed, a pair of drive members connected respectively with the two reels, a rotative driving member, and a common support for the reels and the drive members associated therewith, the support being pivotally mounted on an axis parallel to and between the reel axes to provide for alternative engagement of one drive member or the other with the driving member.

15. A construction according to claim 14 and further including a tape translating capstan, the said driving member being rotative with the capstan, together with controllable means for rotating the driving member and capstan in either direction.

16. Equipment for use with magnetic tape records adapted to be reversibly translated between a pair of reels, comprising a magnetic scanning head located to engage such a tape record in its path of movement between the reels, mounting means for the scanning head providing for stepwise shifting movement of the head to successively register with a series of side-by-side scanning tracks, drive mechanism for the reels comprising a unidirectionally rotative motor shaft and drive elements having friction drive surfaces, one such surface through which one reel is driven being an internal cylindrical surface and another such surface through which the other reel is driven being an external cylindrical surface, and the drive elements including two intermediate elements for respectively interconnecting said internal and external surfaces with the motor shaft and thereby provide for drive of the reels in opposite directions, the motor shaft and said intermediate elements being relatively shiftable to provide for alternative engagement of the intermediate elements and thereby alternatively drive one reel or the other, and mechanism coordinating the stepwise shifting movements of the scanning head with the relative shifting movements of the motor shaft and intermediate elements and providing for head shift from track to track with each reversal of tape translation.

17. Equipment for use with elongated magnetic records comprising, in combination with a pair of reels between which a record is adapted to be fed, mechanism for alternatively driving the reels to wind up a record on either of them including a driving motor positioned with its axis generally paralleling the axes of the reels and having a rotative frictional driving member coaxial with the motor axis, drive transmissions for the respective reels including two drive elements having peripheral friction driving surfaces positioned at different sides of the driving member with their axes generally paralleling the motor driving member, and a pivot mounting said motor with its driving member for oscillative movement about an axis spaced from and extended transversely of the axis of said driving member to alternatively frictionally engage the said driving member with said drive elements.

18. Equipment for use with magnetic tape records, comprising in combination with a pair of upright spaced and parallel reel mounting spindles for supporting a pair of reels between which a tape record is adapted to be fed, spaced guides establishing a tape feed path including a tape run extended generally parallel to the plane containing the axes of the reel spindles and offset to one side of said plane toward the front of the machine, a magnetic scanning head positioned at the inner or back side of said run between said spaced guides, backing means engageable with a tape to hold the tape in scanning engagement with the scanning head, the backing means being positioned at the outer or front side of said run of the tape and including a pivoted mount for the backing means having a pivotal axis extended horizontally to provide for frontward and downward pivoting of the backing device away from the scanning head in a direction toward the front of the machine to facilitate threading of a tape record between the scanning head and backing device.

19. Equipment for use with elongated magnetic tape records adapted to be fed between a pair of tape reels, comprising a pair of reel supporting spindles arranged on spaced parallel upright axes, mechanism for driving the reels including a wheel for driving one reel spindle and a second wheel for driving the other reel spindle, said wheels also being mounted on spaced parallel upright axes and each having a peripheral friction driving surface and being mounted to rotate in the same horizontal plane, a driving motor located below said wheels with its axis extended generally upright in the region between said wheels, the motor having a power delivery element coaxial with the motor axis and located between and in the plane of the peripheral friction driving surfaces of said wheels, the diameter of the power driven element of the motor being less than the distance between the peripheral friction driving surfaces of said wheels, a pivot mounting said motor, the pivot being extended horizontally at an elevation below the peripheral friction driving surfaces of said wheels and further being extended generally transverse to a plane containing the axes of rotation of said wheels to provide for tilting of the motor with its power driven element substantially in said plane, and controllable mechanism for tilting the motor to bring its power driven element alternatively into frictional engagement with one or the other of the peripheral friction driving surfaces of said wheels.

20. Equipment for use with elongated magnetic tape records adapted to be fed between a pair of tape reels, comprising a pair of reel supporting spindles arranged on spaced parallel axes, a beam on which said spindles are journalled, a pivot mounting the beam, the pivot being extended parallel to the axes of the spindles and located intermediate the spindles to provide for conjoint oscillative movement thereof, a rotative frictional drive element fixed to one spindle, a second rotative frictional drive element fixed to the other spindle, and cooperating frictional driving mechanism for said drive elements engageable with said drive elements to drive said elements alternatively according to the direction of oscillative movement of said beam.

21. Equipment for use with elongated magnetic tape records adapted to be fed between a pair of tape reels, comprising a pair of reel supporting spindles arranged on spaced parallel upright axes, tape guiding, driving and scanning mechanism cooperating with a tape in the path of feed between the reels and establishing a tape feed path including a run thereof parallel to a plane containing the axes of the reel spindles and offset from said plane toward the front of the machine, the scanning mechanism including a magnetic scanning head and backing means arranged at opposite sides of a tape in said run and the backing means being displaceable for tape threading, the driving mechanism including a tape driving capstan and an idler roller positioned at opposite sides of a tape in said run to engage a tape therebetween, the idler roller being displaceable for tape threading, and mounting means for the displaceable backing means and for the displaceable idler roller providing for conjoint displacement thereof for tape threading in said run.

22. Equipment for use with elongated magnetic tape records adapted to be fed between a pair of reels, comprising a pair of reel supporting spindles arranged on spaced upright parallel axes, tape guiding and scanning mechanism cooperating with a tape in the path of feed between the reels and establishing a tape feed path including a run thereof parallel to a plane containing the axes of the reel spindles and offset therefrom toward the front of the machine, an elongated gate-like member extended across the front of the machine in front of said run of the tape feed path, a horizontal mounting pivot for said member located at the lower edge thereof and providing for frontward and downward pivoting of said member to expose said run of the tape feed path for threading of a tape therein, a magnetic scanning head engageable with a tape in said run of the feed path, the scanning head being positioned behind said run, tape backing means mounted on the inner side of said gate-like member and engageable with a tape in said run to hold the tape against the scanning head when the gate-like member is pivoted upwardly and rearwardly to a position adjacent said run of the feed path, and a snap action spring for retaining said gate-like member in said position adjacent said run of the feed path.

23. Equipment for use with elongated magnetic tape records adapted to be fed between a pair of tape reels, comprising a pair of reel supporting spindles arranged on spaced parallel upright axes, tape guiding, driving and scanning mechanism cooperating with a tape in the path of feed between the reels and establishing a tape feed path including a run thereof offset to one side of the reel supporting spindles, the scanning mechanism including a magnetic scanning head and a resilient backing pad arranged to engage a tape at opposite sides thereof in said run, said head and said pad being displaceable toward and away from each other to alternatively establish tape scanning and tape threading conditions, spring means for maintaining yielding engagement of the tape between the scanning head and backing pad when said head and pad are conditioned for tape scanning, the driving mechanism including a tape driving capstan and idler roller positioned at opposite sides of a tape in said run to engage a tape therebetween, the tape driving capstan and the idler roller being displaceable toward and away from each other to alternatively establish tape driving and tape threading conditions, spring means for maintaining yielding engagement of the tape between the driving capstan and the idler roller when the capstan and roller are conditioned for tape driving, and movable mounting means for parts of said scanning mechanism and of said driving mechanism providing for displacement of the scanning head and backing pad toward and away from each other conjointly with displacement of the driving capstan and idler roller toward and away from each other.

24. Equipment for use with elongated magnetic tape records adapted to be fed between a pair of reels, comprising a magnetic scanning head, a tape-driving capstan, means establishing a path for a tensioned inter-reel length of tape past and adjacent the scanning head, and past and adjacent the capstan but with the tape in passive relationship thereto, a backing pad pressable against the tape opposite the scanning head to maintain intimate engagement of the tape by the scanning head, a roller pressable against the tape opposite the capstan to maintain the tape in driven relationship to the capstan, said backing pad and roller being movable to provide for spacing thereof from the said scanning head and the capstan respectively to thereby establish a condition for tape threading, and means connected with both the backing pad and the roller for conjointly moving them from the tape threading condition into pressing relationships against the tape opposite the scanning head and capstan respectively.

25. In equipment for use with elongated magnetic tape records adapted to be fed between a pair of reels, a first pair of elements comprising a tape-driving capstan and a roller disposed on opposite sides of the tape between the reels, said elements being relatively movable to cause the roller alternatively to effect and not to effect a pressure of the tape into driven relationship to the capstan, a second pair of elements comprising a magnetic scanning head and a backing member disposed on opposite sides of the tape between the reels, said two last-mentioned elements being relatively movable to cause the backing member alternatively to exert and not to exert a pressure of the tape into intimate engagement with the scanning head, a tensioned inter-reel length of tape when not so pressed by the roller and by the backing member passing in a substantially straight first path past all said elements in contact with but undriven relationship to one of said first pair of elements and adjacent the scanning head and when so pressed passing in substantially the same path, and controllable means connected with at least one movable element of each pair for conjointly causing both the roller and the backing member to alternatively exert and not exert their respective said pressures.

26. In equipment for use with elongated magnetic tape records adapted to be fed between a pair of reels, a first pair of elements comprising a tape-driving capstan and a roller disposed on opposite sides of the tape between the reels, said elements being relatively movable to cause the roller alternatively to effect and not to effect a pressure of the tape into driven relationship to the capstan, a second pair of elements comprising a magnetic scanning head and a backing member disposed on opposite sides of the tape between the reels, said two last-mentioned elements being relatively movable to cause the backing member alternatively to establish and release intimate scanning engagement of the tape with the scanning head, and controllable means connected with movable elements of each of said pairs and providing for conjoint movement thereof toward and away from the other elements of said pairs to alternatively establish a tape threading condition and an operating condition.

27. Equipment for use with elongated magnetic tape records adapted to be fed between a pair of reels, comprising a pair of reel supporting spindles arranged on spaced upright parallel axes, tape guiding and scanning mechanism cooperating with a tape in the path of feed between the reels and including elements spaced along the tape feed path and establishing a run thereof offset from a plane containing the axes of the reel spindles toward the front of the machine, a gate-like member in front of said run and extended lengthwise of said run substantially throughout the length thereof, a horizontal mounting pivot for said member located at the lower edge thereof and providing for frontward and downward pivoting of said member away from said run of the feed path to open up a tape loading channel in front of said elements through which said run of the tape feed path is exposed for loading of a tape therein, the tape guiding and scanning mechanism including a magnetic scanning head engageable with a tape in said run of the feed path, the scanning head being positioned behind said run, and tape engaging means mounted on said gate-like member and movable therewith to provide alternatively for establishment and release of scanning engagement of the scanning head with respect to the tape in a sense providing for establishment of the scanning engagement when the gate-like member is pivoted upwardly and rearwardly to a position adjacent said run of the feed path and for release of the scanning engagement when the gate-like member is pivoted forwardly and downwardly to open up the tape loading channel.

BRUCE ROBERTS.

References Cited in the file of this patent

UNITED STATES PATENTS

| Number | Name | Date |
|---|---|---|
| 788,728 | Poulsen | May 2, 1905 |
| 1,223,771 | Day | Apr. 24, 1917 |
| 1,466,750 | Peterson | Sept. 4, 1923 |
| 1,789,607 | Steurer | Jan. 20, 1931 |
| 1,852,236 | Fenner | Apr. 5, 1932 |
| 2,132,024 | Goldberg | Oct. 4, 1938 |
| 2,215,625 | Thourot | Sept. 24, 1940 |
| 2,408,320 | Kuhlik | Sept. 24, 1946 |
| 2,418,543 | Camras | Apr. 8, 1947 |
| 2,419,476 | Begun | Apr. 22, 1947 |
| 2,430,538 | Somers | Nov. 11, 1947 |
| 2,464,220 | Duncan et al. | Mar. 15, 1949 |
| 2,468,198 | Heller | Apr. 26, 1949 |
| 2,500,903 | Neff | Mar. 14, 1950 |
| 2,509,650 | Oakhill | May 30, 1950 |
| 2,523,387 | Natzke | Sept. 26, 1950 |
| 2,535,486 | Dank | Dec. 26, 1950 |
| 2,586,666 | Kuhlik | Feb. 19, 1952 |

FOREIGN PATENTS

| Number | Country | Date |
|---|---|---|
| 327,104 | Germany | Oct. 7, 1920 |
| 172,296 | Great Britain | Feb. 26, 1923 |
| 390,878 | Germany | Feb. 25, 1924 |
| 392,641 | Great Britain | May 25, 1933 |
| 459,035 | Great Britain | Dec. 31, 1936 |
| 544,760 | Great Britain | Apr. 27, 1942 |